United States Patent
Ajiki et al.

(10) Patent No.: US 10,010,155 B2
(45) Date of Patent: Jul. 3, 2018

(54) MAKEUP SUPPORT DEVICE, MAKEUP SUPPORT METHOD, AND MAKEUP SUPPORT PROGRAM

(71) Applicant: PANASONIC INTELLECTUAL PROPERTY MANAGEMENT CO., LTD., Osaka (JP)

(72) Inventors: Kaori Ajiki, Osaka (JP); Rieko Asai, Osaka (JP); Yasushi Yamaguchi, Osaka (JP); Tomofumi Yamanashi, Kanagawa (JP); Aoi Muta, Osaka (JP); Chie Nishi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 230 days.

(21) Appl. No.: 14/774,321

(22) PCT Filed: Feb. 4, 2014

(86) PCT No.: PCT/JP2014/000591
§ 371 (c)(1),
(2) Date: Sep. 10, 2015

(87) PCT Pub. No.: WO2014/147940
PCT Pub. Date: Sep. 25, 2014

(65) Prior Publication Data
US 2016/0015152 A1    Jan. 21, 2016

(30) Foreign Application Priority Data

Mar. 22, 2013 (JP) .................. 2013-059810

(51) Int. Cl.
*A45D 44/00* (2006.01)
*A45D 40/30* (2006.01)
*G06K 9/00* (2006.01)

(52) U.S. Cl.
CPC .......... *A45D 44/005* (2013.01); *A45D 40/30* (2013.01); *G06K 9/00281* (2013.01); *G06K 9/00288* (2013.01); *A45D 2044/007* (2013.01)

(58) Field of Classification Search
None
See application file for complete search history.

(56) References Cited

U.S. PATENT DOCUMENTS

| 6,866,212 B2 | 3/2005 | Sumiyoshi et al. |
| 7,648,364 B2 * | 1/2010 | Dauga .................. A45D 44/005 434/100 |

(Continued)

FOREIGN PATENT DOCUMENTS

| CN | 102406308 | 4/2012 |
| EP | 1975870 | 10/2008 |

(Continued)

OTHER PUBLICATIONS

Office Action (English Translation of Search Report) issued in China Patent Application No. 201480016331.2, dated Apr. 25, 2017.
(Continued)

*Primary Examiner* — Michelle Chin
(74) *Attorney, Agent, or Firm* — Greenblum & Bernstein, P.L.C.

(57) ABSTRACT

The purpose of the present invention is to provide a makeup support device capable of appropriately supporting the application of makeup even for users who have insufficient makeup skills. The makeup support device (100) has: a makeup style selection unit (250) that selects a makeup style being a makeup method, for each face to be made up; and a makeup style suggestion unit (260) that guides the position of the face to a prescribed position, and sprays cosmetics corresponding to the selected makeup style, using the prescribed position as reference. The makeup style suggestion unit (260) causes, for example, a spray unit that sprays a (Continued)

plurality of cosmetic colors in a prescribed direction to spray a cosmetic color corresponding to the prescribed direction when the face is in the prescribed position, among the colors used for the selected makeup style.

12 Claims, 11 Drawing Sheets

(56) References Cited

U.S. PATENT DOCUMENTS

| | | | |
|---|---|---|---|
| 8,425,477 B2 | 4/2013 | Mou et al. | |
| 8,464,732 B2 | 6/2013 | Wong | |
| 2003/0065589 A1 | 4/2003 | Giacchetti | |
| 2004/0021017 A1 | 2/2004 | Sumiyoshi et al. | |
| 2006/0034731 A1* | 2/2006 | Lewis | G01N 27/121 422/88 |
| 2010/0068247 A1 | 3/2010 | Mou et al. | |
| 2010/0226531 A1 | 9/2010 | Goto | |
| 2012/0067364 A1 | 3/2012 | Wong | |
| 2012/0086834 A1 | 4/2012 | Adachi | |
| 2012/0158184 A1 | 6/2012 | Ma et al. | |
| 2012/0223956 A1* | 9/2012 | Saito | A45D 44/005 345/582 |
| 2012/0325141 A1 | 12/2012 | Mohammadi et al. | |
| 2015/0049111 A1 | 2/2015 | Yamanashi et al. | |
| 2015/0050624 A1 | 2/2015 | Yamanashi et al. | |
| 2015/0086945 A1 | 3/2015 | Yamanashi et al. | |
| 2015/0118655 A1 | 4/2015 | Yamanashi et al. | |
| 2015/0248581 A1 | 9/2015 | Gouda et al. | |
| 2015/0254500 A1 | 9/2015 | Izumi et al. | |
| 2015/0254501 A1 | 9/2015 | Yamanashi et al. | |
| 2015/0262403 A1 | 9/2015 | Yamanashi | |

FOREIGN PATENT DOCUMENTS

| | | |
|---|---|---|
| JP | 2001-104050 | 4/2001 |
| JP | 2001-346627 | 12/2001 |
| JP | 2003-044837 | 2/2003 |
| JP | 2003-310350 | 11/2003 |
| JP | 2005-044195 | 2/2005 |
| JP | 2005-518278 | 6/2005 |
| JP | 2007-175384 | 7/2007 |
| JP | 2008-017936 | 1/2008 |
| JP | 2011-130996 | 7/2011 |
| JP | 2012-502908 | 2/2012 |
| JP | 2012-071126 | 4/2012 |
| JP | 2012-086475 | 5/2012 |
| WO | 2007/022095 | 2/2007 |

OTHER PUBLICATIONS

International Search Report in International Patent Application No. PCT/JP2014/000591, dated Apr. 1, 2014.
U.S. Appl. No. 14/770,167 to Tomofumi Yamanashi et al., filed Aug. 25, 2015.
U.S. Appl. No. 14/773,476 to Kaori Ajiki et al., filed Sep. 8, 2015.
U.S. Appl. No. 14/764,698 to Hajime Tamura et al., filed Jul. 30, 2015.
Extended European Search Report in European Patent Application No. 14770448.0, dated Mar. 8, 2016.

* cited by examiner

410

411 412

| GROUP OF FACIAL FEATURE VALUES | MAKEUP ID |
|---|---|
| F G 1 | F M 1 、F M 2 |
| F G 2 | F M 2 、F M 3 |
| F G 3 | F M 4 、F M 5 |
| ⋮ | ⋮ |

| MAKEUP ID | MAKEUP TYPE | COLOR | CONCENTRATION | RANGE |
|---|---|---|---|---|
| FM1 | T1 | C1 | D1 | A1 |
| FM1 | T2 | C2 | D2 | A2 |
| FM1 | T3 | C3 | D3 | A3 |
| ⋮ | ⋮ | ⋮ | ⋮ | ⋮ |

| FACIAL PART ID | REGION | PERSON ID |
|---|---|---|
| P1 | R1 | H1 |
| P2 | R2 | H1 |
| ⋮ | ⋮ | ⋮ |

*FIG. 9*

MAKEUP SUPPORT DEVICE, MAKEUP SUPPORT METHOD, AND MAKEUP SUPPORT PROGRAM

TECHNICAL FIELD

The present invention relates to a makeup assisting apparatus, a makeup assisting method and a makeup assisting program for assisting facial makeup (cosmetic makeup).

BACKGROUND ART

In recent years, the way of applying makeup to the face (hereinafter, simply referred to as "makeup") has been diversified. Therefore, it has become difficult, particularly for a person who has no sufficient knowledge about makeup to select appropriate makeup from an infinite number of options because it takes an enormous amount of time and effort to actually try, judge and compare various types of makeup.

Under such circumstances, PTL 1 and PTL 2 disclose techniques in which makeup that matches the feature of the face is selected, and a simulation image of the face on which the selected makeup is applied is created and presented, for example. In the techniques disclosed in PTL 1 and PTL 2, a captured image of a face (hereinafter, simply referred to as "face") that is subjected to makeup is acquired, the feature of the face is extracted, and makeup that matches the feature of the face is selected based on a selection criteria set in advance. Then, in the related art, on the acquired image, an image indicating a state of makeup obtained by applying the selected makeup to the face is superimposed to create and display a simulation image.

According to the above-mentioned techniques, it is possible to narrow down targets of simulation image creation as makeup that matches the feature of the face and judge whether the makeup is good or bad without actually performing makeup. That is, it is possible to select appropriate makeup with a less amount of time and effort.

However, for a user who has not enough makeup application skill, it is difficult to reproduce the makeup even when a makeup simulation image is presented. Thus, the technique relating to basic cosmetics described in PTL 3 may be diverted to makeup.

According to the technique described in PTL 3, basic cosmetic materials corresponding to skin care selected for each face are printed on a cosmetic delivery sheet whose base material is a felt, paper or water-soluble material or the like. The user attaches such a cosmetic delivery sheet to the skin of the face with the printed surface being oriented toward the face, and can thereby hold the basic cosmetic materials applied to the face. Instead of these basic cosmetic materials, general cosmetic materials corresponding to the selected makeup may be printed.

CITATION LIST

Patent Literature

PTL 1
Japanese Patent Application Laid-Open No. 2001-346627
PTL 2
Japanese Patent Application Laid-Open No. 2007-175384
PTL 3
Japanese Unexamined Patent Application Publication (Translation of PCT Application) No. 2012-502908
PTL 4
Japanese Patent Application Laid-Open No. 2003-44837
PTL 5
Japanese Patent Application Laid-Open No. 2012-86475
PTL 6
Japanese Unexamined Patent Application Publication (Translation of PCT Application) No. 2005-518278
PTL 7
Japanese Patent Application Laid-Open No. 2003-310350
PTL 8
Japanese Patent Application Laid-Open No. 2011-130996

SUMMARY OF INVENTION

Technical Problem

However, even when the technique described in PTL 3 is used, it is difficult to sufficiently reproduce the selected makeup. This is because successfully transferring the general cosmetic materials from the cosmetic delivery sheet requires a certain degree of skill. When the cosmetic delivery sheet is left attached as a water-soluble substance, dissolution of the cosmetic delivery sheet may cause concentration or distribution of the general cosmetic materials to change, resulting in a smeared makeup. Therefore, the related art has a problem that it is difficult to appropriately assist makeup for users who do not have enough makeup skill.

An object of the present invention is to provide a makeup assisting apparatus, a makeup assisting method, and a makeup assisting program capable of appropriately assisting users who do not have enough makeup skill to perform makeup.

Solution to Problem

A makeup assisting apparatus according to an aspect of the present invention includes: a makeup selecting section that selects makeup for each face, the makeup being a way of applying makeup, the face being subjected to the makeup; and a makeup presenting section that guides a position of the face to a predetermined position and that causes a cosmetic material corresponding to the selected makeup to be sprayed with reference to the predetermined position.

A makeup assisting method according to an aspect of the present invention includes: selecting makeup for each face, the makeup being a way of applying makeup, the face being subjected to the makeup; guiding a position of the face to a predetermined position; and causing a cosmetic material corresponding to the selected makeup to be sprayed with reference to the predetermined position.

A makeup assisting program is a program that causes a computer to execute processing including: selecting makeup for each face, the makeup being a way of applying makeup, the face being subjected to the makeup; guiding a position of the face to a predetermined position; and causing a cosmetic material corresponding to the selected makeup to be sprayed with reference to the predetermined position.

Advantageous Effects of Invention

According to the present invention, it is possible to appropriately assist users who do not have enough makeup skill to perform makeup.

BRIEF DESCRIPTION OF DRAWINGS

FIG. 3 is a diagram illustrating an exemplary makeup table according to Embodiment 2;

FIG. 4 is a diagram illustrating an exemplary makeup information table according to Embodiment 2;

FIG. 9 is a diagram illustrating exemplary facial part information according to Embodiment 2;

DESCRIPTION OF EMBODIMENTS

In the following, embodiments of the present invention will be described in detail with reference to the accompanying drawings.

(Embodiment 1)

Embodiment 1 of the present invention is an example of a basic mode of the present invention.

Figure 1:
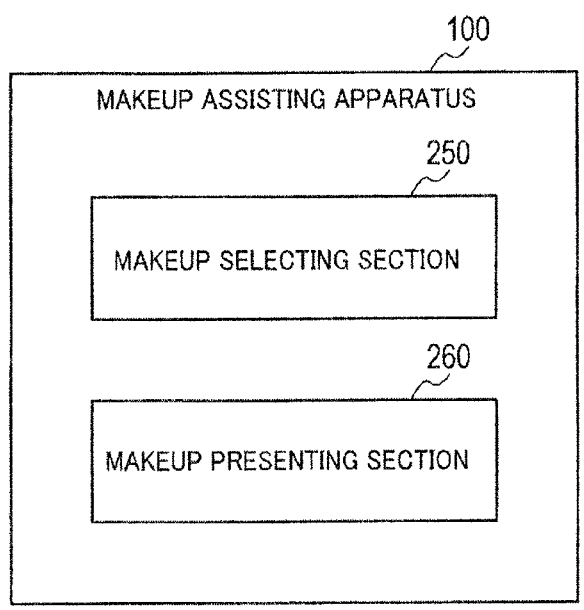
FIG. 1 is a block diagram illustrating an exemplary configuration of a makeup assisting apparatus according to Embodiment 1 of the present invention.

FIG. 1 is a block diagram illustrating an exemplary configuration of a makeup assisting apparatus according to the present embodiment.

In FIG. 1, makeup assisting apparatus 100 is provided with makeup selecting section 250 and makeup presenting section 260.

Makeup selecting section 250 selects makeup which is the way of applying makeup for each face (hereinafter simply referred to as "face") that is subjected to makeup.

Makeup presenting section 260 guides the position and orientation (hereinafter simply referred to as "position") of the face to a predetermined position and orientation (hereinafter simply referred to as "predetermined position"), and causes a cosmetic material corresponding to the selected makeup to be sprayed with reference to the predetermined position.

Makeup assisting apparatus 100 has, for example, a central processing unit (CPU), a storage medium such as a read-only memory (ROM) having a control program stored therein, and a working memory such as a random access memory (RAM), although these components are not illustrated. In this case, the above-described functions of the sections are implemented by the CPU executing the control program.

Such makeup assisting apparatus 100 can guide the position of the face to a predetermined position and cause a cosmetic material corresponding to the selected makeup to be sprayed with reference to the predetermined position. Thus, the user can simply reproduce the selected makeup by setting the face to the predetermined position according to the guidance. Therefore, makeup assisting apparatus 100 can appropriately assist a user who does not have enough makeup skill to perform makeup.

(Embodiment 2)

Embodiment 2 of the present invention is an example of a specific mode of the present invention. Embodiment 2 is an exemplary case where the present invention is applied in an apparatus having a display provided with a touch panel and a digital camera.

<Explanation of Terms>

First, the terms used in the present embodiment are explained.

A "facial part" refers to a part characterizing impression of the face, such as eyes, eyebrows, nose, cheekbones, lips and an outline.

"Facial part ID" refers to identification information of the facial part.

A "region of the facial part" refers to a region occupied by the facial part on an image or in real space, and includes a position of a feature point of the facial part, such as corners of the eyes.

A "facial feature value" refers to a value of a predetermined parameter which indicates features of the face. Here, the facial feature value is multivariate data including a plurality of values such as a ratio of a length of the face with respect to a width of the face, a ratio of a length of the nose with respect to a distance between both eyes and a ratio of a width of the eye with respect to the width of the face.

"Makeup" refers to the way (type) of applying makeup such as eye shadows and lipsticks that corrects impression of features of the facial part to improve aesthetics, and includes at least a color, application concentration and application range of cosmetic material.

"Makeup information" refers to information representing makeup contents.

"Makeup type" refers to the type of makeup such as "foundation," "eye shadow," "lipstick," and "blush" that are identified by at least the positional relationship with facial parts.

"Makeup ID" refers to identification information of makeup.

<Configuration of Makeup Assisting Apparatus>

Next, a configuration of the makeup assisting apparatus according to the present embodiment is described.

Figure 2:
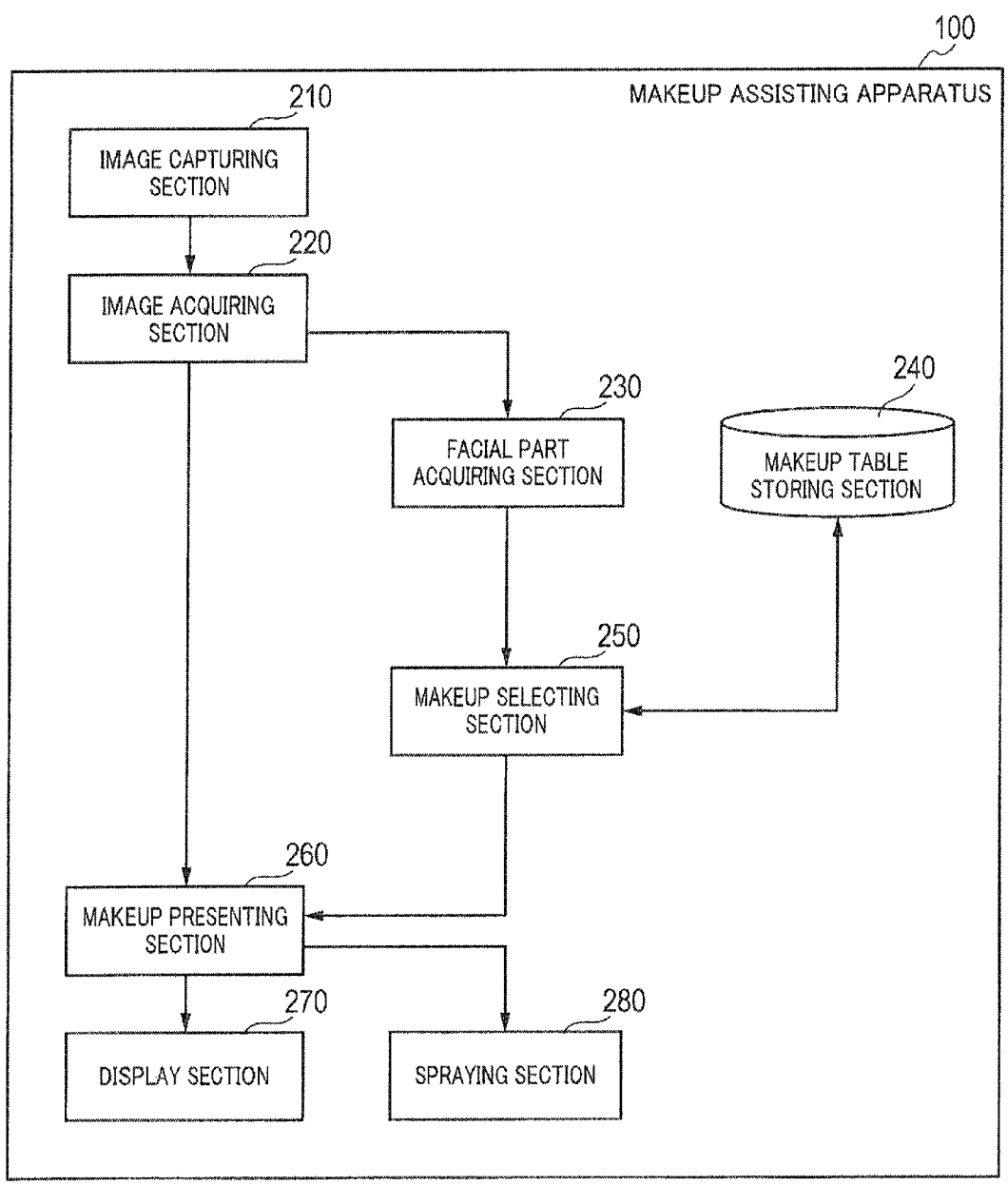
FIG. 2 is a block diagram illustrating an exemplary configuration of a makeup assisting apparatus according to Embodiment 2 of the present invention.

FIG. 2 is a block diagram illustrating an exemplary configuration of the makeup assisting apparatus according to the present embodiment.

In FIG. 2, makeup assisting apparatus 100 includes image capturing section 210, image acquiring section 220, facial part acquiring section 230, makeup table storing section 240, makeup selecting section 250, makeup presenting section 260, display section 270 and spraying section 280.

Image capturing section 210 is, for example, a digital video camera, and captures a moving image of the face. Capturing section 210 outputs the captured moving image to image acquiring section 220. The moving image includes a plurality of time-series images (frame images). Note that in the present embodiment, the face subjected to makeup is the face of the user of makeup assisting apparatus 100.

Image acquiring section 220 sequentially acquires images making up the moving image from the inputted moving image. Image acquiring section 220 outputs the acquired image to facial part acquiring section 230 and makeup presenting section 260.

Facial part acquiring section 230 acquires a region of the facial part from the inputted image. The region of the facial part is acquired, for example, through matching between each partial region of the image and a template image of each facial part prepared in advance (for example, see PTL 4). Facial part acquiring section 230 outputs identification information of the acquired facial part and information indicating the region (hereinafter, referred to as "facial part information") to makeup selecting section 250.

Makeup table storing section 240 stores a makeup table. The makeup table is a table describing, in association with a facial feature value acquired, makeup appropriate for the face having the facial feature value.

It is assumed in the present embodiment that principal component analysis is performed in advance on samples of the facial feature value of an unspecified number of faces to which makeup experts have applied makeup in the past. It is assumed that the results of the principal component analysis are grouped in advance using a publicly known principal component grouping method in which it is determined based on a determination criterion such as whether or not a principal component value is 1 σ or higher. Further, it is assumed that in the makeup table, makeup which has been frequently applied in the past to the face belonging to the group is registered for each facial feature value group.

FIG. 3 is a diagram illustrating an exemplary makeup table.

As shown in FIG. 3, makeup table 410 describes a plurality of makeup IDs 412 for each facial feature value group 411. For example, two makeup IDs 412 of "FM1 and FM2" are associated with facial feature value group 411 of "FG1." This indicates that when the facial feature value of the user's face is FG1, the makeup indicated by the makeup ID of "FM1" and the makeup indicated by the makeup ID of "FM2" are appropriate.

Note that the trends of makeup change frequently and makeup to be presented should be changed frequently. For this reason, it is desirable to periodically update makeup table 410 from a server on the Internet via, for example, a communication circuit (not shown) provided at makeup assisting apparatus 100.

Makeup table storing section 240 in FIG. 2 stores a makeup information table. The makeup information table is a table describing makeup information of the makeup indicated by makeup ID 412 described in makeup table 410 (see FIG. 3).

FIG. 4 is a diagram illustrating an exemplary makeup information table stored in makeup table storing section 240.

As shown in FIG. 4, makeup information table 420 describes makeup ID 421, makeup type 422, color 423, concentration 424 and range 425 in association with one another.

Makeup ID 421 is associated with makeup ID 412 (see FIG. 3) of makeup table 410. Makeup type 422, which is illustrated in a simplified form, more specifically includes "foundation," "eye shadow," "lipstick" and "blush" or the like. Color 423, which is illustrated in a simplified form, more specifically includes an RGB value and a gloss value or the like. Concentration 424, which is illustrated in a simplified form, more specifically includes a level of transparency when an image is superimposed on the image of the face and the way of applying gradation or the like. Range 425, which is illustrated in a simplified form, more specifically includes a set of a relative coordinate group from a feature point, a relative position of a central point with respect to the feature point and a radius, or the like.

A set of color 423, concentration 424 and range 425 includes at least information necessary for imaging. That is, in the present embodiment, suppose the makeup information includes at least information necessary to generate an image when makeup is applied to the face (information indicating the difference in face color).

Note that makeup table 410 shown in FIG. 3 and makeup information table 420 shown in FIG. 4 may be integrated into one table.

Makeup selecting section 250 in FIG. 2 acquires a facial feature value. Note that makeup selecting section 250 may acquire a facial feature value from facial part information inputted from facial part acquiring section 230 or acquire a facial feature value from an image by analyzing the image acquired by image acquiring section 220. Makeup selecting section 250 selects a makeup candidate which is a candidate for makeup subjected to spraying, which will be described later, for each facial part with reference to makeup table 410 (see FIG. 3) based on the acquired facial feature value. Makeup selecting section 250 acquires makeup information of the selected makeup candidate from makeup information table 420 (see FIG. 4) and outputs the makeup information to makeup presenting section 260.

Note that as described above, makeup table 410 registers makeup ID 412 for each facial feature value group. Therefore, makeup selecting section 250 determines to which of facial feature value groups 411 registered in makeup table 410 the facial feature value acquired from the face belongs and selects makeup ID 412 associated with determined facial feature value group 411. This determination is made, for example, by calculating a distance between the acquired facial feature value and a representative value (centroid) of each group.

Makeup selecting section 250 receives from the user, an operation of switching between makeup candidates (hereinafter referred to as "display makeup") to be a display target of a simulation image, which will be described later, and an operation of selecting display makeup. These operations are performed via, for example, a touch panel provided in display section 270, which will be described later. Makeup selecting section 250 selects the selected display makeup as the application makeup which is makeup subjected to spraying, which will be described later. Makeup selecting section 250 acquires makeup information of the selected application makeup from makeup information table 420 (see FIG. 4) and outputs the makeup information to makeup presenting section 260.

Makeup presenting section 260 causes display section 270, which will be described later, to display a simulation image of the makeup candidate. More specifically, makeup presenting section 260 superimposes an image illustrating a condition of the makeup candidate when the makeup candidate is applied to the face on the image inputted from image acquiring section 220 and generates a simulation image. The superimposing position of the image of the makeup candidate is calculated from, for example, facial part information and a range of makeup included in the makeup information. Makeup presenting section 260 then outputs the image data of the generated simulation image to display section 270.

It should be noted that the image in the simulation image is superimposed by, for example, a publicly-known image combining process such as an alpha (α) blending process. In this case, an alpha value (α) is set according to concentration of makeup. The alpha blending process is expressed with, for example, the following Equations 1 to 3:

$$R = r_2 \times \alpha + r_1 \times (1-\alpha) \quad (1)$$

$$G = g_2 \times \alpha + g_1 \times (1-\alpha) \quad (2)$$

$$B = b_2 \times \alpha + b_1 \times (1-\alpha) \quad (3)$$

where $r_1$, $g_1$ and $b_1$ are RGB values of an arbitrary region in the captured image, $r_2$, $g_2$ and $b_2$ are RGB values of the makeup, and R, G and B are RGB values of the corresponding region in the simulation image.

Further, it is assumed that an order of application when makeup is applied to the face in an overlapped manner (hereinafter, referred to as an "application order") is set for each makeup, and an image in a case where the makeup is applied is presented as an image shaded with density according to the concentration. The application order defines, for example, blush should be applied after foundation is applied. In this case, the images may be superimposed on the captured image by makeup presenting section 260 over-painting the image of each makeup in an order according to the application order.

Makeup presenting section 260 guides the position of the face to a predetermined position and sprays cosmetic material corresponding to the selected makeup with reference to the predetermined position.

More specifically, makeup presenting section 260 sequentially generates guide images obtained by superimposing, on the image, guide information indicating a predetermined position for each image that makes up a moving image. Makeup presenting section 260 outputs image data of the generated guide image to display section 270 to display the guide image.

Makeup presenting section 260 causes spraying section 280, which will be described later, to spray a cosmetic material of a color among colors used for the selected makeup that corresponds to a direction in which spraying section 280 performs spraying when the face is located at a predetermined position. In this case, makeup presenting section 260 acquires the position of the face and records a set of the acquired position of the face and the amount of spray per unit time at the position in a predetermined cycle. Makeup presenting section 260 then controls the amount of cosmetic material sprayed per unit time based on the history of the set of the position of the face and the amount of spray per unit time, and thereby makes the actual makeup close to the simulation image.

Note that spraying section 280, which will be described later, mixes the cosmetic material and particulates of a biocompatible polymer, and sprays the multi-color cosmetic material. For this reason, makeup presenting section 260 calculates the amount of cosmetic material sprayed per unit time and the amount of biocompatible polymer sprayed per unit time so that the thickness of the particulates of the biocompatible polymer on the skin becomes approximately 10 nm to 500 nm. In this case, makeup presenting section 260 determines the amount of cosmetic material sprayed per unit time by taking into account the color of particulates of the biocompatible polymer and scattering of light after attachment to the skin. Makeup presenting section 260 then controls spraying section 280 so that the biocompatible polymer is sprayed with the calculated value.

In the present embodiment, suppose makeup presenting section 260 generates cosmetic material spraying information for specifying the color of the cosmetic material to be sprayed, the amount of spray per unit time and the amount of biocompatible polymer sprayed per unit time. Makeup presenting section 260 controls the operation of spraying section 280 by outputting the generated cosmetic material spraying information to spraying section 280.

Display section 270 is, for example, a display part of a display with a touch panel. Display section 270 displays the simulation image to the user of makeup assisting apparatus 100 based on the image data of the inputted simulation image. Display section 270 displays the guide image based on the image data of the inputted guide image.

Spraying section 280 sprays the multi-color cosmetic material toward a predetermined direction. More specifically, spraying section 280 mixes a plurality of types of cosmetic materials of different colors, in colors and amounts of spray per unit time specified in the cosmetic material spraying information inputted from makeup presenting section 260 as appropriate, and sprays the cosmetic materials.

In the present embodiment, spraying section 280 mixes the cosmetic materials and particulates of the biocompatible polymer (hereinafter referred to as "polymer particulates") and sprays a multi-color cosmetic material. Here, the polymer particulates are obtained by crushing a thin film (e.g., see PTL 5) made of a biocompatible polymer such as polylactic acid, polyglycolic acid, polycaprolactone or a copolymer thereof, hyaluronic acid, and chitosan. In the present embodiment, spraying section 280 is a desktop sprayer that performs a spray by being placed on a desk.

Figure 5:
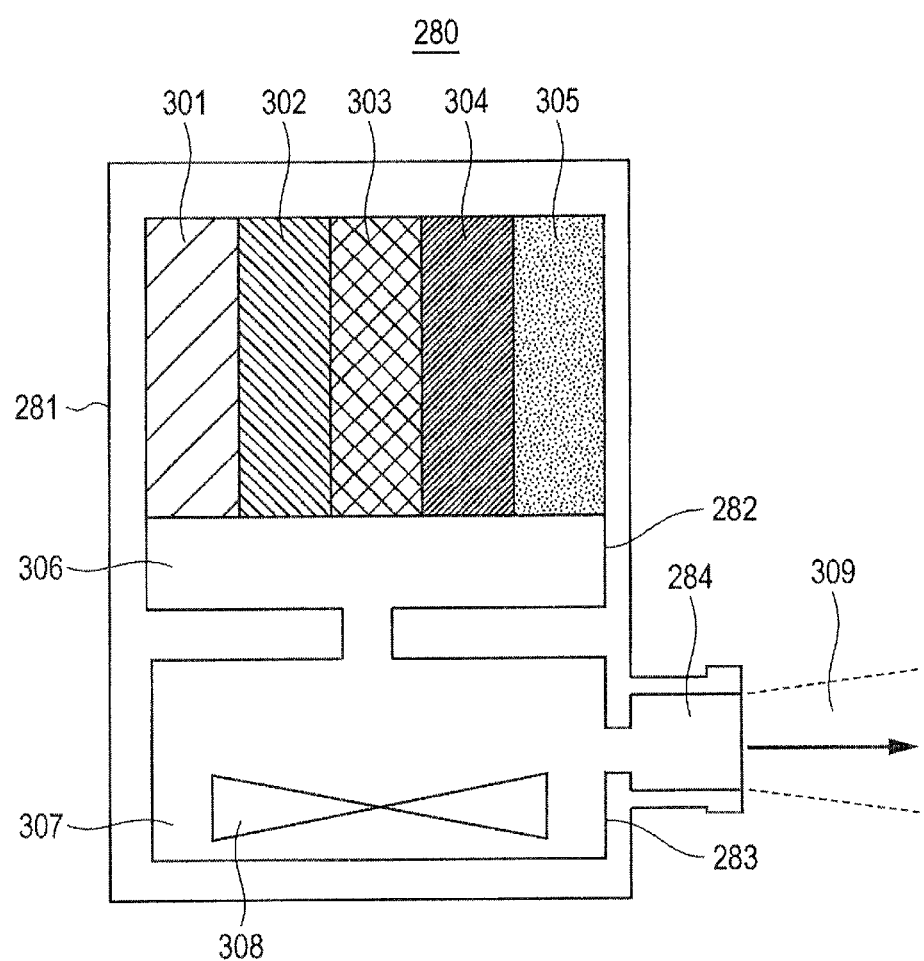
FIG. 5 is a cross-sectional view illustrating an exemplary schematic configuration of a spraying section according to Embodiment 2.

FIG. 5 is a cross-sectional view illustrating an exemplary schematic configuration of spraying section 280.

As shown in FIG. 5, spraying section 280 includes cartridge storing section 282, stirring section 283 and spraying nozzle section 284 in body housing section 281.

Cartridge storing section 282 accommodates a group of plurality cartridges 301 to 304 storing cosmetic materials of different colors and cartridge 305 storing the above-described polymer particulates. Note that cartridges 301 to 305 are replaceable or rechargeable.

Cartridges 301 to 305 discharge the stored cosmetic materials or polymer particulates to space 306 in a lower part of cartridge storing section 282 according to the cosmetic material spraying information. Such space 306 communicates with stirring section 283, which will be described later, and the cosmetic materials and the polymer particulates discharged into space 306 are designed to drop into stirring section 283 speedily.

Stirring section 283 includes, at the bottom, space 307 to receive and store the cosmetic materials and polymer particulates which drop from cartridge storing section 282. Stirring section 283 also includes stirring mechanism 308 to stir the cosmetic materials and polymer particulates stored in space 307. Space 307 communicates with spraying nozzle section 284 which is disposed lateral to space 307 and which will be described later.

Spraying nozzle section 284 sprays the stirred cosmetic materials and polymer particulates stored in stirring section 283 (hereinafter referred to as "cosmetic particulates") in the amount of spray per time indicated in the cosmetic material spraying information over predetermined range (hereinafter referred to as "spray area") 309.

Note that when the cosmetic particulates are a liquid, an electrostatic spraying scheme, for example, can be used as a technique of spraying cosmetic particulates. The electrostatic spraying scheme is a technique that applies a voltage to particulates to generate static electricity, destabilizes, micronizes and sprays the particulates by static electricity (e.g., see PTL 6). The cosmetic particulates sprayed in this way are more likely to be attracted to the skin which is a conductor.

Spraying section 280 further includes a power supply for supplying power to operate the discharge heads of cartridge groups 301 to 305, stirring mechanism 308, and spraying nozzle section 284 although illustration and description of the power supply are omitted herein. Spraying section 280 also includes a shutter disposed between stirring section 283 and spraying nozzle section 284 or a shield plug attached to spraying nozzle section 284 to prevent the accommodated particulates from leaking out or drying out while the particulates are not sprayed.

In the present embodiment, the time required after the cosmetic materials and polymer particulates are discharged from cartridges 301 to 305 until the cosmetic particulates made up of the discharged cosmetic materials and polymer particulates are sprayed is assumed to be very short. Suppose spraying section 280 realizes operation corresponding to the inputted cosmetic material spraying information substantially in real time.

At least image capturing section 210, display section 270, and spraying section 280 are assumed to be arranged in front of the user's face, in proximity thereto (e.g., integrally therewith) at a distance of approximately 20 cm from the user's face. Furthermore, makeup presenting section 260 grasps a positional relationship between image capturing section 210 and spraying section 280 and generates the above-described guide information based on such a positional relationship.

Although not illustrated, makeup assisting apparatus 100 in FIG. 2 includes, for example, a CPU, a storage medium such as a ROM storing a control program and a working memory such as a RAM. In this case, the above-described functions of the sections are implemented by the CPU executing the control program.

Such makeup assisting apparatus 100 can guide the position of the face to a predetermined position and spray a cosmetic material corresponding to the selected makeup with reference to the predetermined position. This allows the user to set the face at the predetermined position according to the guidance and thereby simply reproduce the selected makeup.

<Operation of Makeup Assisting Apparatus>

Next, an operation of makeup assisting apparatus 100 will be described.

Figure 6:
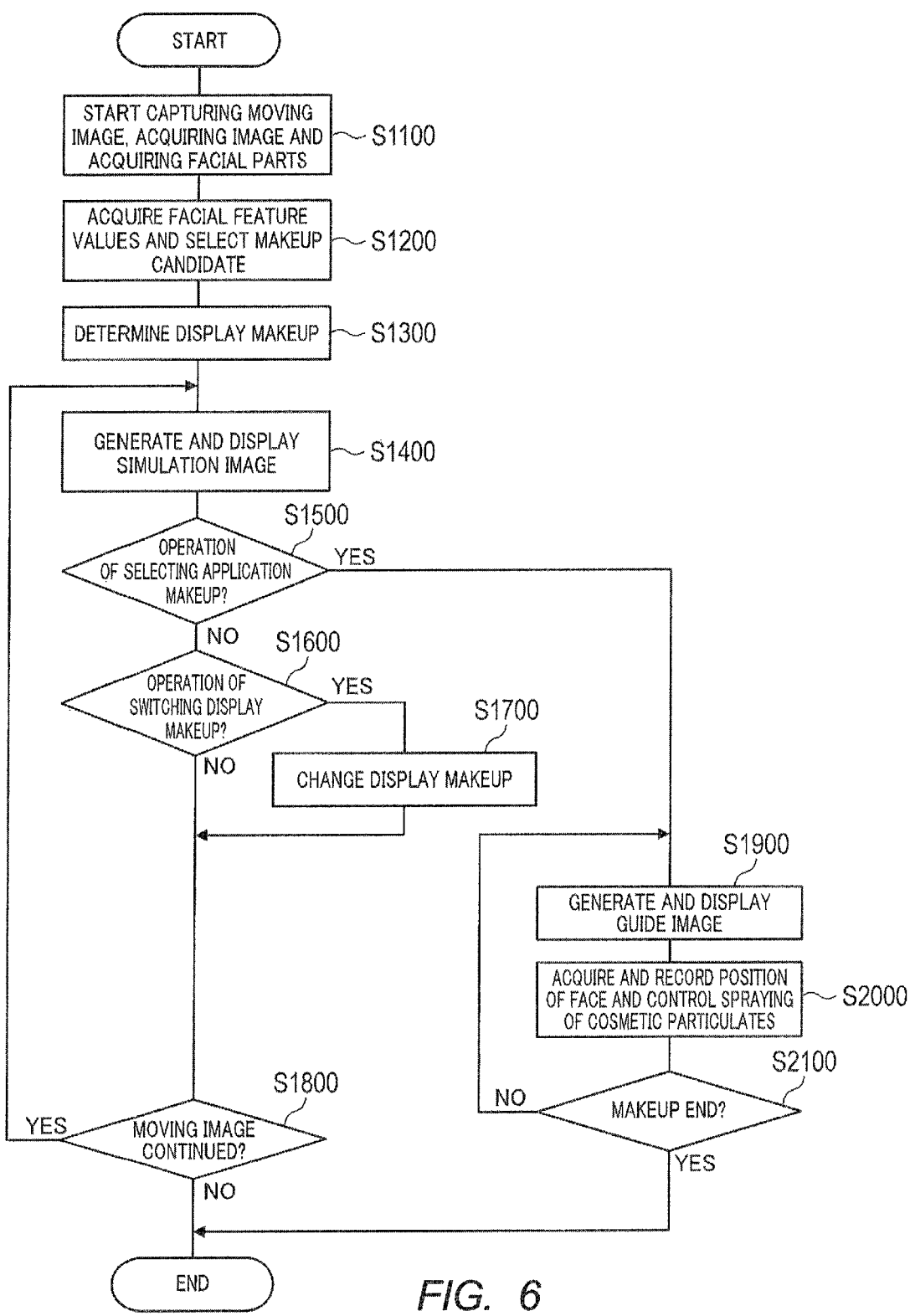
FIG. 6 is a flowchart illustrating an exemplary operation of the makeup assisting apparatus according to Embodiment 2.

FIG. 6 is a flowchart illustrating an exemplary operation of makeup assisting apparatus 100.

First, in step S1100, image capturing section 210 starts capturing a moving image of the user's face and image acquiring section 220 starts acquiring images that make up the captured moving image. The facial part acquiring section starts acquiring facial parts of the face included in the images.

In this case, facial part acquiring section 230 analyzes, for example, image 510 (see FIG. 7) and thereby extracts feature points of the face (facial parts) from image 510. Facial part acquiring section 230 acquires a region formed of feature points that make up an identical facial part as a region of the facial part. Facial part acquiring section 230 generates facial part information from the region of the acquired facial part.

Figure 7:
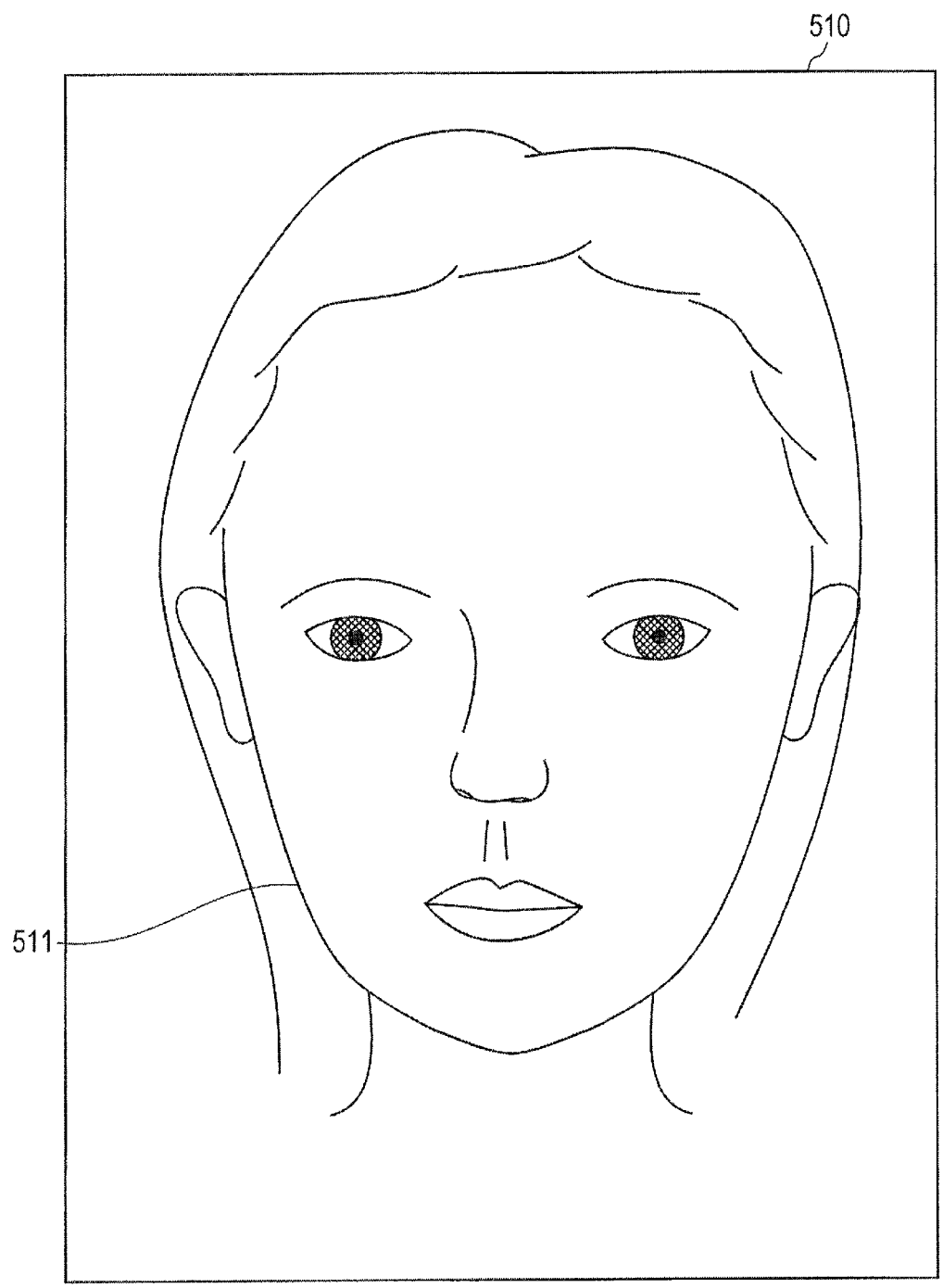
FIG. 7 is a diagram illustrating an exemplary image according to Embodiment 2.

FIG. 7 is a diagram illustrating an exemplary image acquired in step S1100 in FIG. 6.

As illustrated in FIG. 7, image 510 includes an image of the face of the user (hereinafter, referred to as a "face image") 511. Here, the user wears no makeup.

Figure 8:
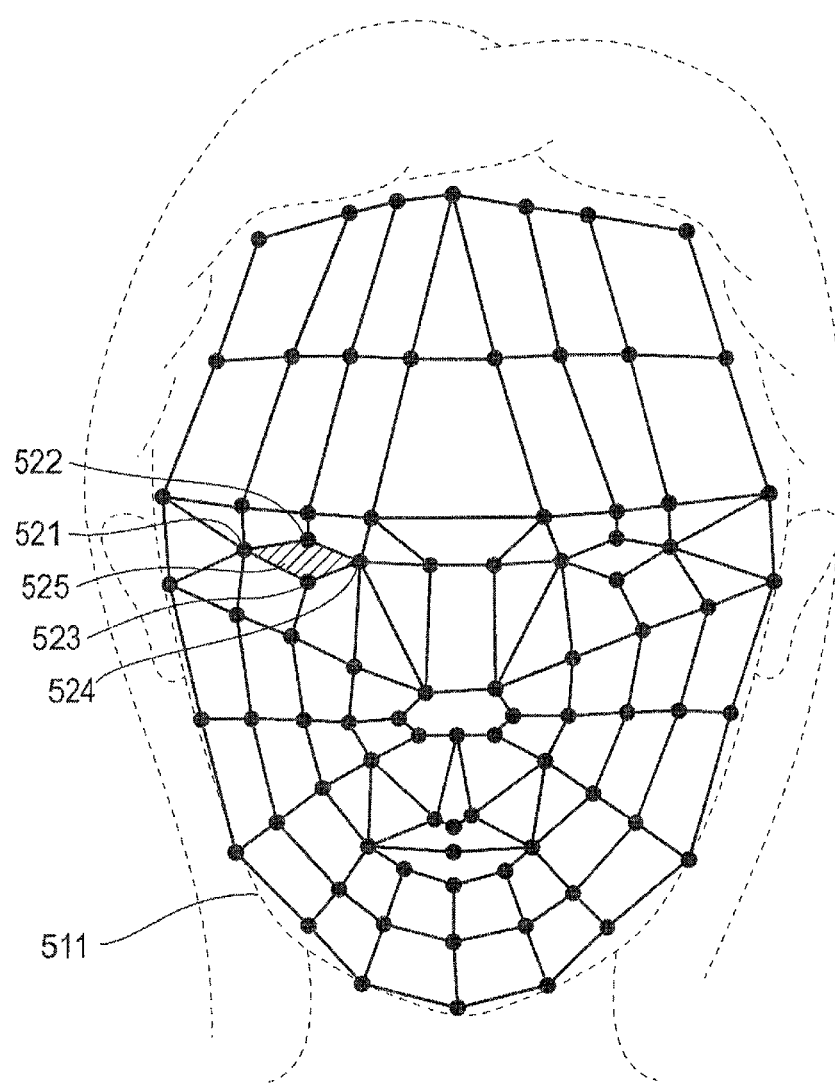
FIG. 8 is a diagram illustrating an exemplary arrangement of feature points of the face according to Embodiment 2.

FIG. 8 is a diagram illustrating an exemplary arrangement of feature points of the face extracted in step S1100 of FIG. 6.

As shown in FIG. 8, a plurality of feature points (shown by symbols "●") are extracted from face image 511. For example, first to fourth feature points 521 to 524 make up the right eye. Therefore, facial part acquiring section 230 acquires region 525 surrounded by first to fourth feature points 521 to 524 as the region of the right eye.

FIG. 9 is a diagram illustrating exemplary facial part information generated in step S1100 of FIG. 6.

As illustrated in FIG. 9, facial part information 530, for example, describes region 532 and person ID 533 for each facial part ID 531. Facial part ID 531 is identification information of the facial part such as the left eye and the upper lip. Region 532, which is information indicating a range of the region of the facial part in the image, is a list of coordinate values of a coordinate system set on the image, for example. Person ID 533 is identification information of the person. As person ID 533, for example, a value designated by the user through operation to a display with touch panel or the like is set every time capturing is started.

In step S1200 of FIG. 6, makeup selecting section 250 acquires the facial feature value. The facial feature value is, as described above, multivariate data regarding a predetermined parameter indicating the features of the face. Makeup selecting section 250 acquires the facial feature value from one of image 510 (see FIG. 7), a group of facial feature points of the face (see FIG. 8) and facial part information 530 (see FIG. 9), for example. Makeup selecting section 250 selects a makeup candidate based on the acquired facial feature value. Here, suppose a plurality of makeup candidates are selected.

In step S1300, makeup selecting section 250 determines one display makeup from among a plurality of makeup candidates. Makeup selecting section 250 outputs makeup information corresponding to the determined display makeup to makeup presenting section 260.

In step S1400, makeup presenting section 260 generates a simulation image based on makeup information relating to the determined display makeup and causes display section 270 to display the simulation image.

Figure 10:
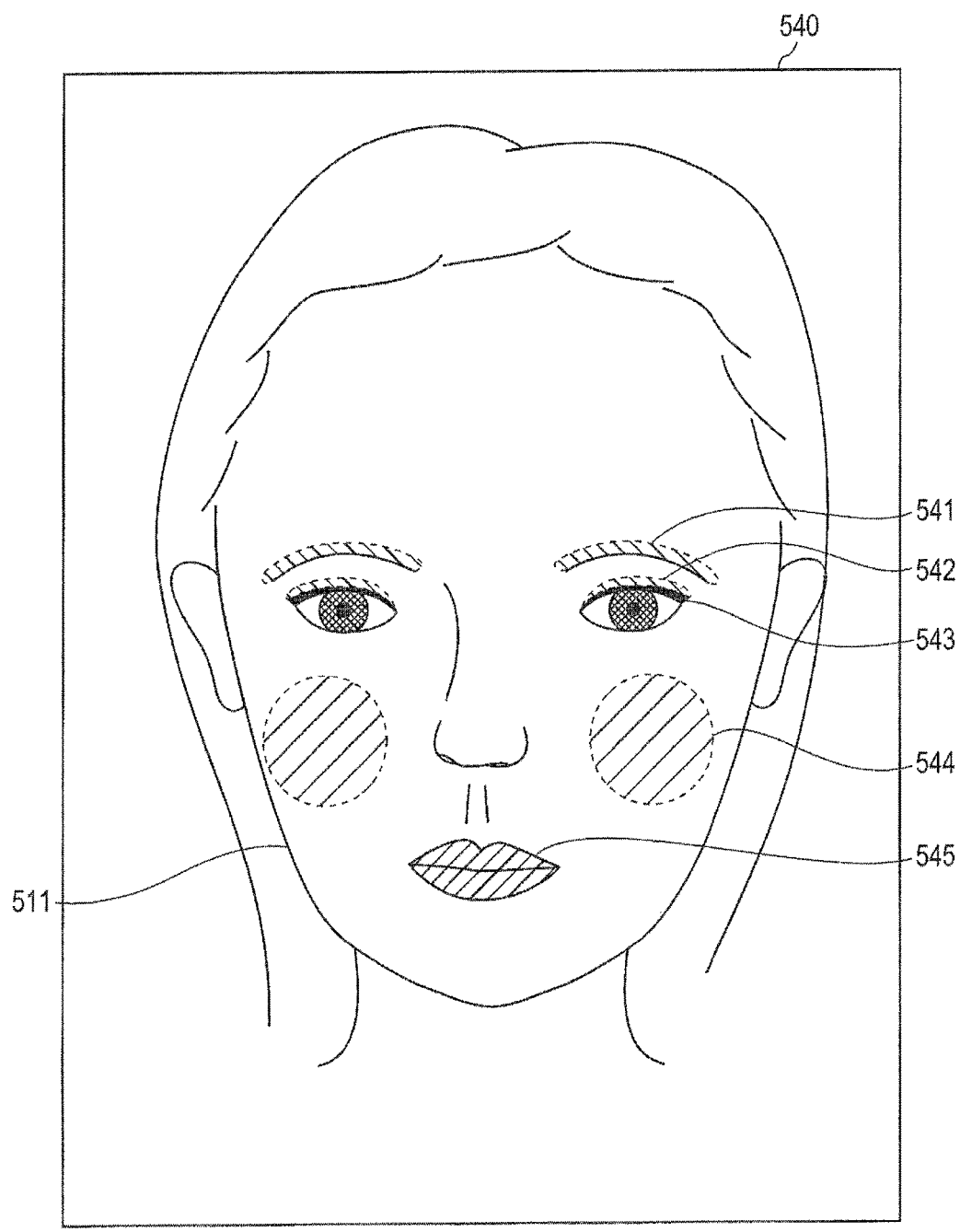
FIG. 10 is a diagram illustrating an exemplary simulation image according to Embodiment 2.

FIG. 10 is a diagram illustrating an exemplary simulation image generated in step S1400 of FIG. 6.

As shown in FIG. 10, simulation image 540 is an image in which makeup images 541 to 545 such as an eyebrow, eye shadow, eyeliner, blush, and lipstick are superimposed on face image 511.

In step S1500, makeup selecting section 250 determines whether or not an operation of selecting the current display makeup as the application makeup is performed. When such an operation is not performed (S1500: NO), makeup selecting section 250 moves the process to step S1600.

In step S1600, makeup selecting section 250 determines whether or not an operation of switching the display makeup to another makeup candidate is performed. When such an operation is not performed (S1600: NO), makeup selecting section 250 moves the process to step S1800, which will be described later. When such an operation is performed (S1600: YES), makeup selecting section 250 moves the process to step S1700.

In step S1700, makeup selecting section 250 changes the display makeup to another makeup candidate, outputs the corresponding makeup information to makeup presenting section 260 and proceeds to step S1800.

In step S1800, image acquiring section 220 determines whether or not input of a moving image is continued. When the input of a moving image is continued (S1800: YES), image acquiring section 220 returns the process to step S1400 and moves the process to the next image. When the input of a moving image is finished (S1800: NO), image acquiring section 220 ends a series of processes.

On the other hand, when an operation of selecting one makeup candidate as the application makeup is performed (S1500: YES), makeup selecting section 250 moves the process to step S1900.

In step S1900, makeup presenting section 260 generates a guide image to guide the position of the user's face to a predetermined position and causes display section 270 to display the guide image.

Figure 11:
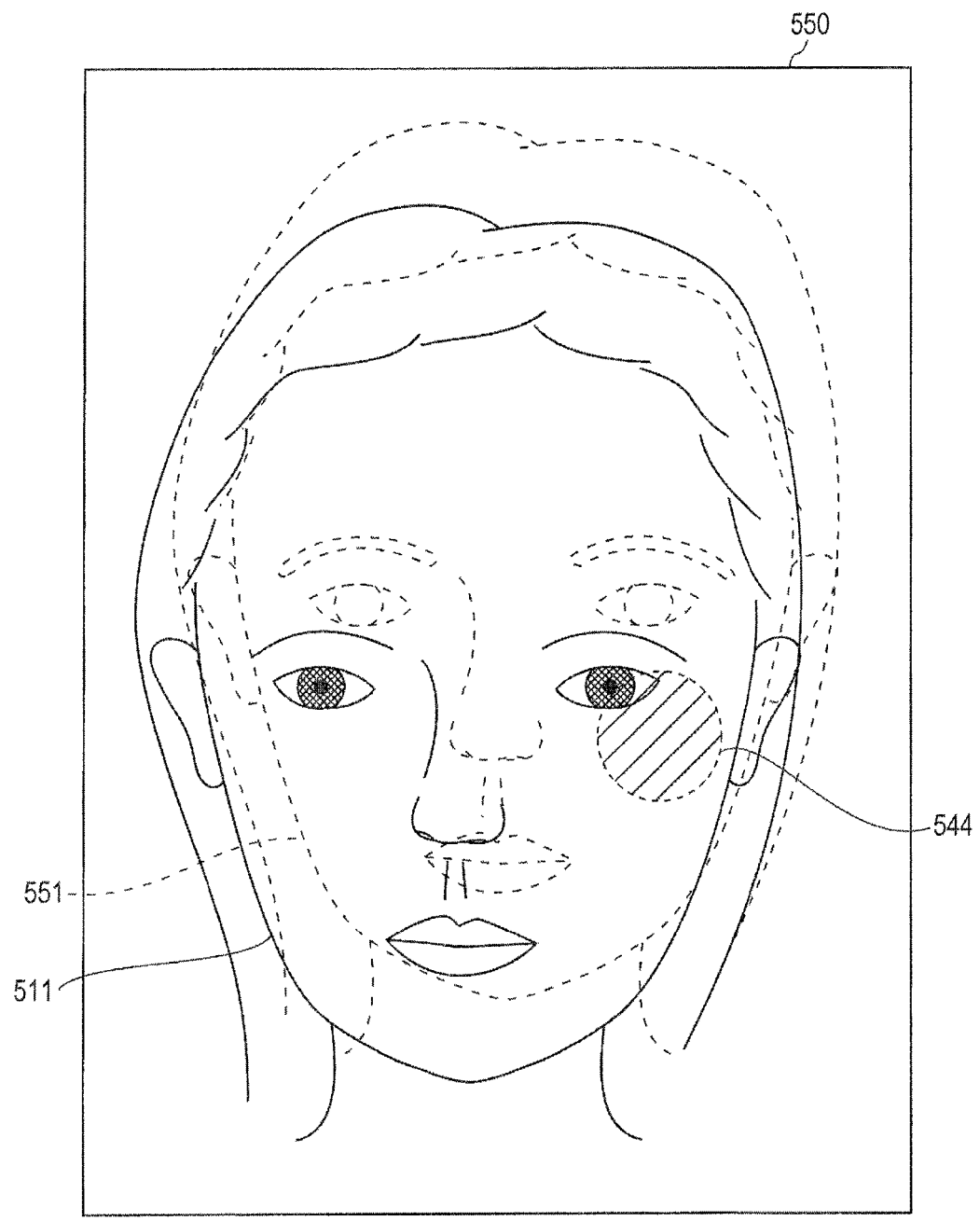
FIG. 11 is a diagram illustrating an exemplary guide image according to Embodiment 2.

FIG. 11 is a diagram illustrating an exemplary guide image. Here, an example is illustrated where makeup of blush on the left cheek is applied among different kinds of makeup.

As shown in FIG. 11, guide image 550 is an image resulting from superimposing, on face image 511, face position image 551 indicating a predetermined position using the position or the like of a facial part and left cheek blush image 544 as guide information. As face position image 551, for example, a face image captured in the past can be used.

Makeup presenting section 260 calculates an arrangement of face position image 551 from a positional relationship between an image capturing range of image capturing section 210 and spray area 309 of spraying section 280 (see FIG. 5) and a positional relationship between each facial part and a left cheek blush. That is, makeup presenting section 260 generates face position image 551 so that spray area 309 matches or is included in the range of the left cheek blush, and superimposes face position image 551 on face image 511.

While viewing display section 270, the user moves his/her face or changes the orientation of the face so that face image 511 matches face position image 551. In this way, the user can make sure that the cosmetic particulates of the blush sprayed from spraying section 280 correspond to the position of blush image 544 presented in simulation image 540 (see FIG. 10).

In step S2000 of FIG. 6, makeup presenting section 260 acquires the position of the face from, for example, facial part information and records a set of the acquired position of the face and the amount of spray per unit time at the position. Note that this recording is performed in a predetermined cycle through a determination process in step S2100. Makeup presenting section 260 controls the amount of cosmetic particulates sprayed per unit time by spraying section 280 based on the history of the set of the position of the face and the amount of spray per unit time so that the actual makeup becomes close to the simulation image.

For example, suppose a region other than the range of the skin subjected to makeup by spraying (e.g., range in which blush is applied, hereinafter referred to as "makeup target region") is located in spray area 309. In this case, makeup presenting section 260 reduces the amount of spray per unit time to 0. This is to prevent the cosmetic particulates from attaching to regions other than the makeup target region.

For example, suppose the makeup target region is moved to spray area 309 so as to include spray area 309. In this case, makeup presenting section 260 controls the amount of spray per unit time to such a value that the necessary amount of spray is achieved in a predetermined time such as 2 seconds. This is to ensure that the cosmetic particulates are attached to the makeup target region at an appropriate concentration.

For example, suppose a region of the makeup target region where spraying has been already performed moves to spray area 309 again. In this case, makeup presenting section 260 controls the amount of spray per unit time to such a value that a value obtained by subtracting the amount of spray already performed from the necessary amount of spray is achieved in a predetermined time. This is to prevent makeup from becoming too thick, which would otherwise be caused by spraying of cosmetic particulates in such a form as to give two coats.

In step S2100, makeup presenting section 260 determines whether or not makeup about the selected makeup has ended. When the makeup has not ended yet (S2100: NO), makeup presenting section 260 returns the process to step S1900 and continues displaying of the guide image and control of spraying of the cosmetic particulates. When the makeup has ended (S2100: YES), makeup presenting section 260 ends a series of processes.

Note that when makeup application order is set, makeup presenting section 260 preferably sprays the cosmetic materials in that application order.

Of the selected makeup, makeup presenting section 260 may consider, as the spraying target, only makeup which is applied to a relatively wide range such as foundation or blush and for which sharpness is not required. In this case, makeup presenting section 260 preferably causes display section 270 to switch between a guide image and an image to guide makeup which is not a spraying target and display the image.

<Effects of Present Embodiment>

As described above, makeup assisting apparatus 100 according to the present embodiment guides the position of the face to a predetermined position and sprays cosmetic materials corresponding to selected makeup with reference to the predetermined position. This allows the user to set the face at the predetermined position according to the guidance, and can thereby easily reproduce the selected makeup. Therefore, makeup assisting apparatus 100 can appropriately assist a user who does not have enough makeup skill to perform makeup.

Makeup assisting apparatus 100 according to the present embodiment mixes a plurality of types of cosmetic materials of different colors as appropriate and sprays a multi-color cosmetic material. This allows makeup assisting apparatus 100 to reproduce a complicated color and delicate tone of the makeup selected by makeup selecting section 250 with high accuracy.

Makeup assisting apparatus 100 according to the present embodiment mixes the multi-color cosmetic materials and particulates of a biocompatible polymer, and sprays a multi-color cosmetic material. This allows the cosmetic materials in multiple colors to be mixed uniformly and allows the cosmetic material to be more easily attached to the skin. The particulates attached to the skin form a mesh-like, thin, closely-skin-attachable, and flexible thin film on the surface of the skin. That is, makeup assisting apparatus 100 forms such a thin film that keeps its initial state while retaining moderate permeability for oxygen and water content on the surface of the skin. Thus, makeup assisting apparatus 100 can implement makeup with less burden on the skin and less likely to cause smeared makeup.

<Other Techniques of Selecting Makeup Candidate>

Note that the makeup candidate selection technique is not limited to the above-described example. For example, makeup selecting section 250 may select fashionable makeup preferentially irrespective of a facial feature value or select a makeup candidate based on a facial feature value and other information.

Makeup is selected based on, for example, a skin condition. The skin condition is, for example, smear, wrinkle, sebum secretion, hidden smear, water content, blood flow and perspiration or the like of the skin of the face, and acquired, for example, through analysis of an image captured using daily light, ultraviolet rays, infrared light or laser light.

More specifically, makeup selecting section 250 selects makeup that applies a concealer to the smeared part and dark circles under the eyes, for example.

Makeup may also be selected based on a predicted change in the skin condition. A change in the skin condition is predicted from the above-described skin condition, environment information, and physical condition information. The environment information includes weather, air temperature, season and an amount of solar radiation, for example. The physical condition information includes a sleeping time, body temperature, amount of physical activities, eyelid opening, eye blink frequency, time in menstruation cycle and blood pressure, for example.

More specifically, when the user lacks sleep, for example, makeup selecting section 250 selects makeup that applies a concealer under the eyes assuming that dark circles under the eyes may become darker after a lapse of a certain time.

Makeup may also be selected based on the user's attribute information such as age or residential region.

Various kinds of information used to select makeup may be inputted through the user's operation or may be acquired through communication by makeup assisting apparatus 100 from a server on the Internet, or various electric appliances or sensor devices or the like used by the user.

Furthermore, for example, makeup selecting section 250 may perform color correction of makeup.

The impression of a color of the face varies depending on colors of surroundings or a scene. For example, the face color of a person wearing red-based clothes looks like a color slightly more similar to a turquoise color than the original color. Moreover, the same makeup may be perceived as a fancy tone or quiet tone depending on the scene.

Thus, makeup selecting section 250 acquires a color of clothes, a color of the skin and a color of the hair or the like of the user from the image, selects makeup of an appropriate tone as a makeup candidate based on the acquired color or corrects the selected tone of the makeup candidate to an appropriate tone. Thus, makeup assisting apparatus 100 can select more appropriate makeup and present it to the user. The user can apply makeup of appropriate tone without judging whether the tone is good or bad by oneself. Such a selection of makeup exhibits a high effect in selecting a foundation color in particular.

<Selection of Basic Cosmetic Material for Each Face>

Makeup assisting apparatus 100 may also be configured to select skin care implemented by spraying a cosmetic material for each face.

In this case, makeup selecting section 250 selects skin care using for each face instead of or in addition to makeup. Makeup presenting section 260 causes spraying section 280 to spray the basic cosmetic material corresponding to the selected skin care.

Skin care is selected based on the skin condition, for example.

More specifically, makeup selecting section 250 selects skin care that sprays a basic cosmetic material having a high light scattering effect to smeared parts and selects skin care that sprays a basic cosmetic material having a high skin-whitening effect to hidden smeared parts, for example. Makeup selecting section 250 selects skin care that sprays a basic cosmetic material having high astringent action and sebum adsorption action over parts estimated to have a high degree of aging based on the ellipticity of skin pores.

Skin care is also selected based on, for example, a change in a predicted skin condition.

More specifically, for example, when the user's body temperature is high, makeup selecting section 250 selects skin care that sprays a moisture-retaining beauty lotion by assuming that the drying of the skin will advance.

Various kinds of information used to select skin care may be inputted through the user's operation or may be acquired through communication by makeup assisting apparatus 100 from a server on the Internet, or various electric appliances or sensor devices or the like used by the user.

Especially when the cosmetic material is mixed with the particulates of a biocompatible polymer and sprayed, it is possible to reduce the possibility of smeared makeup with the basic cosmetic material due to perspiration and sebum as described above and maintain the initial distribution condition for a long time. Maintaining such a distribution state is suitable for a basic cosmetic material that prevents ultraviolet rays from reaching the skin, having a so-called UV (ultraviolet ray) cutting function.

<Other Configurations of Sprayer>

The configuration of spraying section 280 is not limited to the above-described example.

For example, spraying section 280 may adopt a spray gun scheme as the technique of spraying cosmetic particulates.

Spraying section 280 may also be a handy-type sprayer. In this case, spraying section 280 preferably exchanges information such as cosmetic material spraying information with makeup presenting section 260 through wireless communication.

Furthermore, spraying section 280 may also be an inkjet printer that sprays ink over a narrow range while scanning a wide range. In this case, the cosmetic material spraying information can be, for example, image data that specifies a color and concentration of each position.

When the cosmetic material particulates are made of a raw material that is closely attachable to the skin, the polymer particulates need not always be used for spraying. Furthermore, the cosmetic material particulates may be sprayed by being mixed with biocompatible weak volatile solution such as water or ethanol, instead of the polymer particulates or in addition to the polymer particulates. Furthermore, the cosmetic material particulates may be mixed with dry gel. However, in this case, makeup needs to be applied by the fingers to perform makeup. In this case, makeup assisting apparatus 100 preferably presents, to the user, information guiding where the makeup should be applied.

The mechanism for carrying and mixing cosmetic materials of a plurality of colors and polymer particulates is not limited to the above-described example. The space in which the cosmetic material particulates to be sprayed are stored may be cleaned every time the type or color of makeup is changed.

For example, the spraying section carries each particulate using the pump and cleans the space in which the cosmetic material particulates are stored through injection of a cleaning agent and ejection of the injected cleaning agent using the pump (e.g., see PTL 7). This allows makeup assisting apparatus 100 to deal with a change in the type or color of makeup more easily.

<Other Techniques of Guiding Position of Face>

The technique of guiding the position of the face to a predetermined position is not limited to the above-described example.

For example, when presenting guide information to guide the position of the face to a predetermined position, makeup presenting section 260 may output speech such as "Please bring your face 5 cm closer to the spraying section" or "please turn your face a little to the right."

When spraying section 280 is a handy type sprayer, makeup presenting section 260 may present guide information for guiding the position and orientation of the sprayer. Such guide information guides the position and orientation of the sprayer so that the relative position of the face with respect to the sprayer becomes a predetermined position. This guidance may be performed by displaying an image showing the position and orientation of the sprayer or through text display or speech output.

Note that in this case, makeup presenting section 260 preferably acquires the position and orientation of spraying section 280 (that is, the position and orientation of the face with respect to spraying section 280) from a captured image or output of a sensor that detects the position and orientation, attached to spraying section 280. Makeup presenting section 260 preferably controls the above-described amount of spray per unit time based on the acquired position and orientation of spraying section 280.

When spraying section 280 is an inkjet printer that sprays ink over a narrow range while scanning a wide range, makeup presenting section 260 may guide the position of the face to a predetermined position using a frame or the like that fits the face into the operation range. In this case, the frame is preferably configured so as to cover parts other than the outline of the face such as hairline, with the position and orientation thereof being fixed at least with respect to spraying section 280.

<Other Techniques of Controlling Amount of Spray>

Makeup presenting section 260 may be configured so as not to spray the cosmetic material particulates and polymer particulates at timing the user takes a breath.

In this case, makeup assisting apparatus 100 needs to further include a breath timing detection section that detects breath timing of the person subjected to makeup (person whose face is subjected to makeup). The breath timing detection section detects motion of the body of the person subjected to makeup from, for example, a face image of the person subjected to makeup and detects breath timing of the person subjected to makeup from the detected motion of the body (e.g., see PTL 8). The breath timing detection section may also detect breath timing by detecting humidity and temperature around spraying section 280 or detecting the body motion of the person subjected to makeup through far-infrared rays or UWB (ultra wide band) wave. Makeup presenting section 260 controls the amount of cosmetic material sprayed per unit time based on the detected breath timing. This prevents the person subjected to makeup from aspirating the cosmetic material particulates and polymer particulates into the body.

Makeup assisting apparatus 100 may receive a predetermined operation indicating whether or not to perform spraying and control whether or not to perform spraying according to whether or not such an operation is performed. For example, makeup assisting apparatus 100 may be configured to perform spraying only for a time span during which a predetermined key switch is pressed. This allows the user to control ON/OFF of spraying.

<Variations with Other Configurations>

In addition, the above-described various types of tables may not be stored in makeup assisting apparatus 100. For example, if makeup assisting apparatus 100 can be connected to a network, makeup assisting apparatus 100 can access a server on the network in which the above-described tables are stored and can select makeup.

Further, makeup assisting apparatus 100 may be a distributed arrangement system. For example, in such a system, among functional sections illustrated in FIG. 2, only capturing section 210 and display section 270 are disposed at a terminal of the user, a portable sprayer is used as spraying section 280 and the other sections of the apparatus are disposed on a server on the network, or on a home PC of the user. In this case, communication sections for performing communication between these apparatuses need to be provided for the respective apparatuses.

Further, makeup selecting section 250 may detect outside light and acquire the facial feature value in a state where the influence of external light is reduced from the image.

Further, the specific contents of makeup are not limited to the above-described examples. For example, makeup to be presented includes the way of applying lip gloss, and the like to be presented.

The makeup target region is not limited to the face, but may include the neck, the back of the hand, or the like. Makeup assisting apparatus 100 sprays, for example, foundation to be applied to the face so as to have gradation with the foundation becoming gradually thin from the upper part of the neck downward. Note that such gradation may be applied also on the face in directions toward the hairline and the neck.

Makeup supporting apparatus 100 may present skin care to the user using a technique different from spraying of cosmetic materials. For example, makeup supporting apparatus 100 may cause display section 270 to display information on the skin care. The skin care in this case may include various skin care measures other than basic cosmetic materials such as the way of applying face massage, the way of applying dietary habits.

A makeup assisting method of the present disclosure includes: a makeup selecting section that selects makeup for each face, the makeup being a way of applying makeup, the face being subjected to the makeup; and a makeup presenting section that guides a position of the face to a predetermined position and that causes a cosmetic material corresponding to the selected makeup to be sprayed with reference to the predetermined position.

Preferably, the makeup assisting apparatus further includes a spraying section that sprays a multi-color cosmetic material toward a predetermined direction, in which the makeup presenting section causes the spraying section to spray a cosmetic material having a color corresponding to the predetermined direction when the face is located at the predetermined position among colors used for the selected makeup.

Preferably, in the makeup assisting apparatus, the spraying section mixes a plurality of types of cosmetic materials of different colors as appropriate and sprays the resultant multi-color cosmetic material.

Preferably, the makeup assisting apparatus further includes: an image acquiring section that acquires a captured image of the face; a facial part acquiring section that acquires a region of a facial part of the face from the image;

and a display section that displays an image, in which the makeup selecting section selects a makeup candidate which is a candidate for makeup subjected to the spraying for each facial part, the makeup presenting section causes the display section to display a simulation image obtainable by superimposing, on the image, an image indicating a state of the makeup candidate when the makeup candidate is applied to the face, and the makeup selecting section receives an operation of selecting the displayed makeup candidate and selects the selected makeup candidate as application makeup that is subjected to the spraying.

Preferably, the makeup assisting apparatus further includes an image capturing section that captures a moving image of the face, in which the image acquiring section acquires images that make up the moving image, the makeup presenting section sequentially generates guide images obtainable by superimposing guide information indicating the predetermined position on the images for the respective images that make up the moving image and causes the display section to display the guide images.

Preferably, in the makeup assisting apparatus, the makeup presenting section acquires the position of the face and controls an amount of the sprayed cosmetic material per unit time based on the acquired position of the face.

Preferably, in the makeup assisting apparatus, the makeup presenting section records a set of the acquired position of the face and the amount of spraying per unit time at the position in a predetermined cycle and controls the amount of the cosmetic material sprayed per unit time based on a history of the set of the position of the face and the amount of spraying per unit time.

Preferably, the makeup assisting apparatus further includes a breath timing detection section that detects breath timing of a person subjected to makeup whose face is a makeup target, wherein the makeup presenting section controls the amount of the cosmetic material sprayed per unit time based on the detected breath timing.

Preferably, in the makeup assisting apparatus, the spraying section mixes the multi-color cosmetic material and particulates of a biocompatible polymer and sprays the resultant multi-color cosmetic material.

A makeup assisting method of the present disclosure includes: selecting makeup for each face, the makeup being a way of applying makeup, the face being subjected to the makeup; guiding a position of the face to a predetermined position; and causing a cosmetic material corresponding to the selected makeup to be sprayed with reference to the predetermined position.

A makeup assisting program of the present disclosure that causes a computer to execute processing including: selecting makeup for each face, the makeup being a way of applying makeup, the face being subjected to the makeup; guiding a position of the face to a predetermined position; and causing a cosmetic material corresponding to the selected makeup to be sprayed with reference to the predetermined position.

It is to be noted that the program may be recorded in a computer-readable recording medium. The recording medium may be a non-transitory recording medium such as a flash memory.

The disclosure of Japanese Patent Application No. 2013-059810, filed on Mar. 22, 2013, including the specification, drawings and abstract is incorporated herein by reference in its entirety.

INDUSTRIAL APPLICABILITY

The present invention is useful as a makeup assisting apparatus, a makeup assisting method and a makeup assisting program which can appropriately assist makeup for users who do not have enough makeup skill.

REFERENCE SIGNS LIST

100 Makeup assisting apparatus
210 Image capturing section
220 Image acquiring section
230 Facial part acquiring section
240 Makeup table storing section
250 Makeup selecting section
260 Makeup presenting section
270 Display section
280 Spraying section
281 Body housing section
282 Cartridge storing section
283 Stirring section
284 Spraying nozzle section
301 to 305 Cartridges
306, 307 Space
308 Stirring mechanism

The invention claimed is:

1. A makeup assisting apparatus comprising:
a processor that acquires a captured moving image of a face being subjected to the makeup, the moving image including a plurality of individual images, wherein
the processor selects makeup for the face, the makeup being a way of applying makeup,
the processor guides a position of the face to a position of a face position image showing an outline of the face such that an outline of the face in one of the plurality of individual images matches the outline shown in the face position image, by sequentially generating guide images obtained by superimposing the face position image on the plurality of individual images and displaying the guide images on a display, and
the processor causes a sprayer to spray a cosmetic material corresponding to the selected makeup on the face with reference to the position of the face position image.

2. The makeup assisting apparatus according to claim 1, wherein
the sprayer that sprays a multi-color cosmetic material toward a predetermined direction, and
the processor causes the sprayer to spray a cosmetic material having a color, of colors used for the selected makeup, the color corresponding to the predetermined direction when the face is located at the position of the face position image.

3. The makeup assisting apparatus according to claim 2, wherein the sprayer mixes a plurality of cosmetic materials of different colors and sprays the resultant multi-color cosmetic material.

4. The makeup assisting apparatus according to claim 3, wherein the sprayer mixes the multi-color cosmetic material and particulates of a biocompatible polymer and sprays the resultant multi-color cosmetic material, the particulates of biocompatible polymer being obtained by crushing a thin film made of a biocompatible polymer, and the thin film comprising one of polylactic acid, polyglycolic acid, polycaprolactone, a copolymer of polylactic acid, a copolymer of polyglycolic acid, a copolymer of the ploycaprolactone, hyaluronic acid and chitosan.

5. The makeup assisting apparatus according to claim 2, wherein
the processor acquires a region of a facial part of the face from an image of the plurality of individual images, the processor selects a makeup candidate for each facial part, the makeup candidate being a candidate for makeup subjected to the spraying, the processor causes the display to display a simulation image obtained by superimposing, on the image of the plurality of individual images, an image indicating a state of the makeup candidate when the makeup candidate is applied to the face, and the processor receives an operation of selecting the displayed makeup candidate and selects the selected makeup candidate as application makeup that is subjected to the spraying.

6. The makeup assisting apparatus according to claim 2, wherein the processor detects breath timing of a person subjected to makeup whose face is a makeup target, and the processor controls an amount of cosmetic material sprayed per unit time based on the detected breath timing.

7. The makeup assisting apparatus according to claim 1, wherein the processor acquires the position of the face, and controls an amount of cosmetic material sprayed per unit time based on the acquired position of the face.

8. The makeup assisting apparatus according to claim 7, wherein the processor records a set of the acquired position of the face and the amount of spraying per unit time at the acquired position in a predetermined cycle, and controls the amount of cosmetic material sprayed per unit time based on a history of the set of the position of the face and the amount of spraying per unit time.

9. The makeup assisting apparatus according to claim 1, wherein the face position image showing the outline of the face is displayed separately of the captured moving image of the face.

10. The makeup assisting apparatus according to claim 1, wherein the displayed position of the face position image showing the outline of the face does not change when the face position image is superimposed on the plurality of images while the displayed position of the outline of the face in the plurality of individual images changes.

11. A makeup assisting method comprising:

acquiring a captured moving image of a face being subjected to makeup, the moving image including a plurality of individual images;

selecting makeup for the face, the makeup being a way of applying makeup;

guiding a position of the face to a position of a face position image showing an outline of the face such that an outline of the face in one of the plurality of individual images matches the outline shown in the face position image, by sequentially generating guide images obtained by superimposing the face position image on the plurality of individual images of the moving image and displaying the guide images on a display; and causing a sprayer to spray a cosmetic material corresponding to the selected makeup on the face with reference to the position of the face position image.

12. A non-transitory computer readable recording medium storing a program that causes a computer to execute processing comprising:

acquiring a captured moving image of a face being subjected to makeup, the moving image including a plurality of individual images;

selecting makeup for the face, the makeup being a way of applying makeup;

guiding a position of the face to a position of a face position image showing an outline of the face such that an outline of the face in one of the plurality of individual images matches the outline shown in the face position image, by sequentially generating guide images obtained by superimposing the face position image on the plurality of individual images of the moving image and displaying the guide images on a display; and causing a sprayer to spray a cosmetic material corresponding to the selected makeup on the face with reference to the position of the face position image.

* * * * *